United States Patent [19]

Martin et al.

[11] E Re. 31,461

[45] Reissued Dec. 13, 1983

[54] METHOD OF PREPARING A SECTION FOR AN OVERHEAD DOOR

[75] Inventors: David O. Martin, Salt Lake City; Lawrence G. Martin, Bountiful, both of Utah

[73] Assignee: Martin Overhead Door and Electronics Co., Salt Lake City, Utah

[21] Appl. No.: 426,751

[22] Filed: Sep. 29, 1982

Related U.S. Patent Documents

Reissue of:

[64] Patent No.: 4,347,653
Issued: Sep. 7, 1982
Appl. No.: 246,805
Filed: Mar. 23, 1981

U.S. Applications:

[62] Division of Ser. No. 59,880, Jul. 23, 1979, Pat. No. 4,284,119.

[51] Int. Cl.[3] ..... B23P 19/00
[52] U.S. Cl. ..... 29/526 R; 29/458
[58] Field of Search ..... 29/155 R, 458, 428, 29/526 R; 160/201, 232; 52/588, 809, 826

[56] References Cited

U.S. PATENT DOCUMENTS

| | | | |
|---|---|---|---|
| 2,836,266 | 5/1958 | Leeser | 52/809 X |
| 2,863,503 | 12/1958 | Stroup | 160/201 |
| 3,070,196 | 12/1962 | Switzgable | 52/809 X |
| 3,104,699 | 9/1963 | Wolf et al. | 160/201 X |
| 3,220,519 | 11/1965 | De Ridder | 52/826 X |
| 3,402,457 | 9/1968 | Landow et al. | 29/428 |
| 3,611,548 | 10/1971 | Parris | 29/428 X |
| 3,740,916 | 6/1973 | Kenaga | 160/201 X |
| 3,891,021 | 6/1975 | Geoffrey | 160/201 X |
| 4,008,745 | 2/1977 | Bailey | 160/201 X |
| 4,182,080 | 1/1980 | Naylor | 52/588 X |

*Primary Examiner*—Charlie T. Moon
*Attorney, Agent, or Firm*—J. Winslow Young; H. Ross Workman; Allen R. Jensen

[57] ABSTRACT

A novel overhead door section system and method, the section including a section facing fabricated from a high tensile steel and secured to a novel end stile and center stile. The end stile includes an angle support secured therein. The angle support clamps an end of the section facing against a front face of the end stile and is secured to ribs in the section facing and to a side wall of the end stile. A novel back facing and method provide additional strength to the panel and may also enclose an insulative layer inside the panel.

7 Claims, 2 Drawing Figures

METHOD OF PREPARING A SECTION FOR AN OVERHEAD DOOR

Matter enclosed in heavy brackets [ ] appears in the original patent but forms no part of this reissue specification; matter printed in italics indicates the additions made by reissue.

This *application is a Reissue of application Ser. No. 6/246,805, filed, Mar. 23, 1981, now U.S. Pat. No. 4,347,653, issued Sept. 7, 1982, which* is a division of application Ser. No. 6/059,880, filed Jul. 23, 1979, now U.S. Pat. No. 4,284,119, issued Aug. 18, 1981.

BACKGROUND

1. Field of the Invention

This invention relates to an overhead door system and, more particularly, to an overhead door and overhead door section system and method, the section including a novel section facing fabricated from a higher tensile steel than previously used in the prior art and incorporating a novel end stile and center stile system and a novel truss and backing sheet combination.

2. The Prior Art

Overhead door systems such as found in residential and commercial entrances such as to garages, and the like, generally involve doors having horizontally arrayed sections joined by hinges into a door unit. The door is mounted in a vertical track with curves upwardly into a horizontal position so that the door may be opened upwardly and supported horizontally in an open position. The sections are joined by the hinges along the longitudinal edges of the sections so that the overall door structure will generally conform to the radius of curvature of the track as it changes from vertical to horizontal. Customarily, each of the sections are fabricated separately and thereafter hinged together along a longitudinal edge to provide the complete overhead door structure.

Historically, the sections are fabricated from a galvanized and/or prepainted sheet metal stock which has been rolled or otherwise formed into the particular section facing, web and parallel interior flange configurations. Vertical stiles are usually secured to the section facing and interior flanges at spaced locations by spotweld or rivet techniques. Most prior art overhead door systems use hinges that are secured directly to the section stiles so that stresses imposed by the raising and lowering of the door are transmitted from section to section through the hinges to the vertical stiles and, correspondingly, from the stiles through the spotwelds to the section facing and flange. However, it is well known in the art that a spotweld in a prepainted and/or galvanized surface can result in a poor bond between the metal surfaces so joined. Spotwelds are also more susceptible to attack by corrosion, thereby further weakening the bond. Additionally, the section facings of the various overhead door section systems of the prior art are fabricated from mild steel sheet metal having a relatively low (average, 33,000 pound) yield strength. Accordingly, extra weight metal and additional reinforcing struts must be incorporated into the door system to provide desired strength characteristics. These reinforcing struts not only detract from the section appearance but also increase the weight of the overall door system. Added weight requires stronger and, therefore, heavier tracks, springs, and the like, with a corresponding increase in cost. Prior art overhead door systems fabricated according the foregoing procedure have failed as a result of (a) spotweld failure, (b) the inherent low strength characteristics of mild steel, and/or (c) inadequate strut support. It is also recognied that the formation of spotwelds on the external surface of the section facing detracts from or otherwise mars the visual appearance of the overhead door system. Additionally, spotwelds on the external surface require the section to be painted after fabrication whereas it is well-known in the art that a more uniform and stable paint surface is achieved when the sheet metal is prepainted prior to fabrication.

It is also well known that steel sections alone provide very poor insulation for heated structures. The practice has, therefore, been to furnish overhead door systems with insulated sections as an option. The sections are usually insulated with a suitable insulative material sandwiched between the section facing and a back facing. The construction features of the prior art sections generally require the use of a segmented and, therefore, visually unattractive and non-supportive back facing fabricated from steel or aluminum sheet metal.

One prior art door section system is disclosed in U.S. Pat. No. 3,740,916 wherein a section flange is secured to a vertical stile by means of a plurality of tabs which are adapted to be bent over into openings formed in the stile.

Another door section system is disclosed in U.S. Pat. No. 3,891,021 wherein adjacent sections are joined at the hinge portion.

In view of the foregoing, it would be an advancement in the art to provide an overhead door and overhead door section system and method whereby a higher tensile steel is utilized in the fabrication of the door sections and wherein novel advances are made for securing the section facing and interior flanges to the vertical stiles and hinges. It would be a further advancement in the art to provide a novel overhead door section system and method utilizing the unique properties of high tensile steel to provide a section that does not require additional struts for reinforcement and support to obtain desired strength characteristics. It would also be an advancement in the art to provide improvements in the section facing, stile, insulation, and back facing of a section thereby reducing the time required for fabrication and assembly. Another advancement would be to incorporate the properties of a higher tensile steel into an overhead door system. Another advancement would be to utilize steel sheet prepainted with a hard, high gloss finish and formed into a novel structure which does not require spotwelds or the like for structural bonding. Such a novel overhead door section system and method is disclosed and claimed herein.

BRIEF SUMMARY AND OBJECTS OF THE INVENTION

The present invention relates to a novel overhead door and overhead door section and method of fabrication wherein a section facing is fabricated from a higher tensile, prepainted steel and is secured to a novel vertical stile by a novel method. The vertical stiles are configurated with a generally C configuration (in cross section) and the end stiles have a front face that overlaps the edge of the section facing. An angle support is adapted to be received inside each end stile to clamp the edge of the section facing between the angle support and the front face of the end stile. The ends of the stiles are adapted to be received within channels formed within the margin between longitudinal edges of the section facing and flanges formed therein. The vertical stiles combine with the flange and section facing to form a hinge point for the section unit. Rivets, self-tapping screws and bolts are used to assemble the sections thereby avoiding the use of the spotwelds thereby achieving a more strongly joined section system. The section facing and vertical stiles provide a novel insulation procedure and also readily receive a novel, continuous backing sheet over the insulation. The continuous backing sheet provides a truss effect for greatly increased strength to the section.

It is, therefore, a primary object of this invention to provide improvements in overhead door section construction.

Another object of this invention is to provide an improved method for assembling an overhead door section system.

Another object of this invention is to provide improvements in assembling an insulated overhead door section system.

Another object of this invention is to provide an overhead door section system wherein the individual sections are hinged together with the hinges being fastened with bolts, or the like, to heavy gauge vertical stiles through a widened flange without the use of spotwelds or tabs.

Another object of this invention is to provide an overhead door section utilizing the unique properties of high tensile steel.

Another object of this invention is to provide an overhead door section fabricated from a high tensile steel sheet which has been prepainted with a hard, high gloss finish.

These and other objects and features of the present invention will become more fully apparent from the following description and appended claims taken in conjunction with the accompanying drawing.

DETAILED DESCRIPTION OF THE PREFERRED EMBODIMENTS

Figures 1, 2:
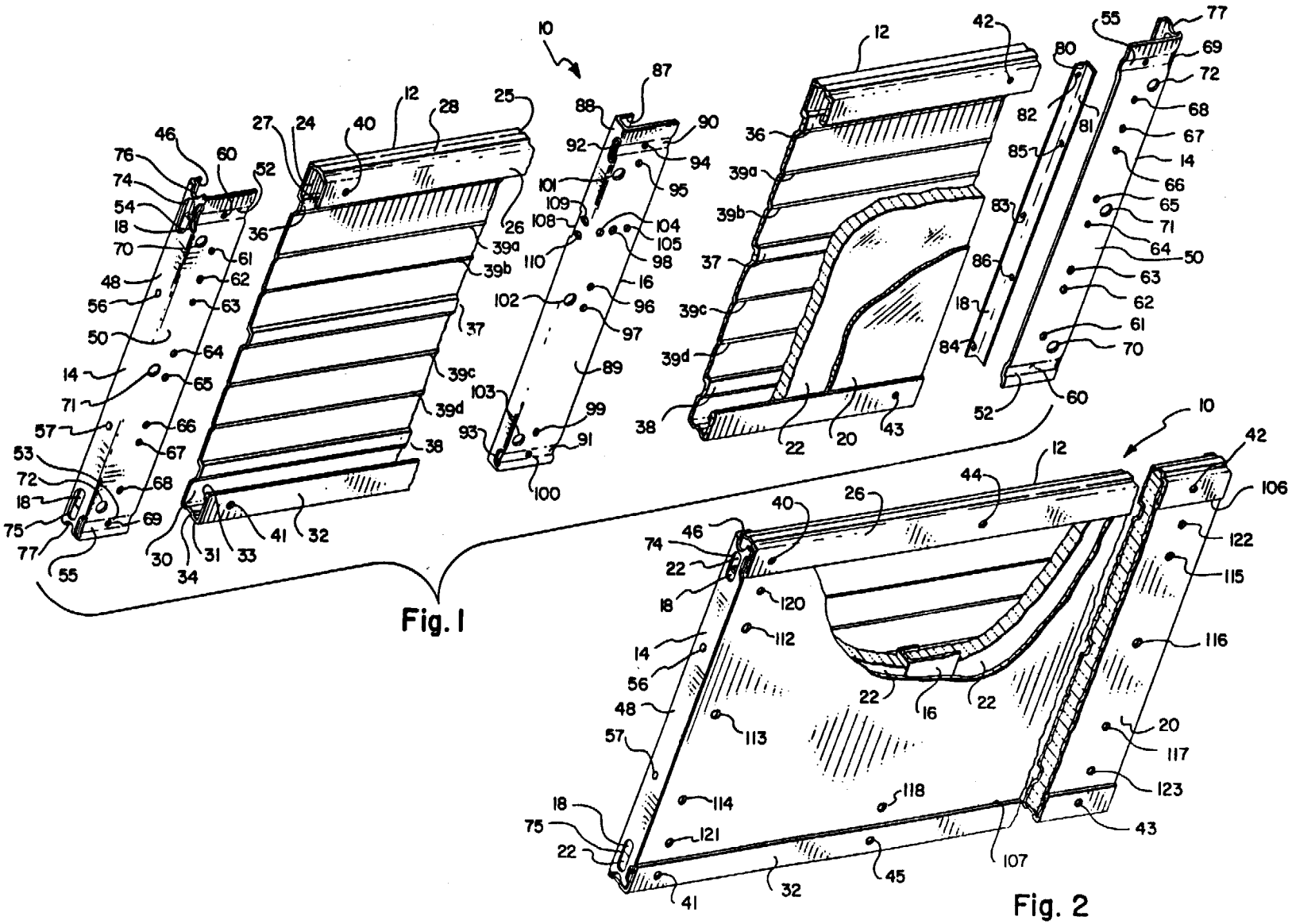
FIG. 1 is an exploded, perspective view of the overhead door section assembly of this invention with portions broken away to reveal internal structure.
FIG. 2 is a perspective view of the section assembly of FIG. 1 shown in the assembled configuration with portions broken away to reveal internal structure.

The invention is best understood by reference to the drawing wherein like parts are designated with like numerals throughout.

General Discussion

High tensile steel, generally defined as a steel having a yield strength on the order of about 60,000 pounds, does not lend itself well to fabrication of shapes having sharp corners and return bends. Historically, it has been determined in the art that it is difficult to fabricate a section facing for an overhead door section from high tensile steel when the fabrication requires passing the steel sheet through forming rolls to produce 90 degree or more bends. Previous attempts to pass high tensile steel through such forming rolls have resulted in section facings that are warped and have numerous waves, ripples, dimples, and even cracks in the metal. Nonglossy, prepainted, high tensile steel does not produce satisfactory results. However, under direction of the inventors, it has been discovered that high tensile steel can be shaped by forming rolls when increased pressure is exerted against the steel by the forming rolls. This increased pressure tends to scrape off the nonglossy paint. However, the surprising discovery is that a high tensile steel sheet prepainted with a hard, high gloss finish can be effectively shaped by forming rolls into highly suitable section facings. High gloss paint is not suitable to the prior art forms because of the spotwelding process employed in final fabrication. One suitable paint for use in preparing high tensile steel sheet for fabrication into the overhead door section facings of this invention is a hard, high gloss, acrylic enamel by the Midland Division of the Dexter Corporation, 31500 Hayman Street, Hayward, Calif. 94544 under their formula code 7451-A86F.

The use of high tensile steel in the section facing of this invention provides a stronger overhead door section. Also, since it is possible to use a thinner gauge steel to provide the same or even greater strength, the overhead door section and, correspondingly, the overhead door system, is lighter in weight.

Referring now to FIGS. 1 and 2, the overhead door section assembly of this invention is shown generally at 10 and includes a section facing 12, end stiles 14 at each end of section facing 12, at least one center stile 16 and, selectively, a back facing 20. Section 10 may, advantageously, include a layer of insulative material 22 sandwiched between section facing 12 and back facing 20. Section facing 12 is fabricated from an elongated, generally rectangular sheet of metal, preferrably a prepainted, high tensile steel sheet metal. The longitudinal edges of section facing 12 are formed into an upper channel 24 and a lower channel 30. Upper channel 24 is formed by the margin of section facing 12 being folded laterally into an upper, lateral web 25 and downwardly into a parallel flange 26. The edge of flange 26 is folded into a single hem 27 to thereby eliminate any sharp or dangerous edges on the exposed edge of channel 24. A tongue 28 is formed as a midrib in web 25 and is adapted to mate with a corresponding groove (not shown) similar to groove 34 in web 31 of channel 30. Channel 30 is similarly formed at the bottom edge of section facing 12 and includes a lower, lateral web 31 and a flange 32 with a single hem 33 formed along the edge of flange 32. Holes 40–43 are punched in the respective flanges 26 and 32 and mate with corresponding holes 60 and 69 in end stile 14 for the purpose of assisting in securing section facing 12 to end stiles 14, the underlying holes in end stiles 14 serving primarily as bolt attachment points for a hinge (not shown).

Section facing 12 further includes a plurality of longitudinal ribs 36–38 formed therein, the ribs having a generally trapezoidal cross-section and a depth approximately one-fourth the thickness of the section. The bottom surface of ribs 36–38 provides an anchoring surface for securement of section facing 12 to end stiles 14 and to center stile 16 as will be discussed more fully hereinafter. A plurality of longitudinal grooves 39a–39d are also interspaced between ribs 36–38 to impart a pleasing visual appearance and to provide additional structural integrity to section facing 12.

End stiles 14 at each end of section facing 12 shown in FIG. 1 are identical but are reversed end-to-end to show their relationship with respect to section facing 12. To accommodate this feature, the respective ends of end stile 14 are mirror images thereby readily accommodating the foregoing feature of reversibility. End stile 14 is cut, stamped and shaped from a sheet metal stock preferrably having at least a 33,000 pound yield strength and is formed into a modified "C" configuration in cross-section with a front face 46, a sidewall 48 and a rear face 50. Front face 46 is adapted to wrap around the edge of section facing 12 (as best seen in FIG. 2) while sidewall 48 encloses the interior of section assembly 10. The ends of rear face 50 include lateral grooves 52 and 55 to receive therein hems 27 and 33, respectively. Additionally, hole 60 coincides with hole 40 while hole 69 coincides with hole 41 for the purpose of receiving a bolt (not shown). The bolts adapt end stile 14 as a secure attachment point for a hinge (not shown). Access to the bolt (not shown) passed through hole 60 is provided through an opening 74 in sidewall 48. A corresponding opening 75 is provided for access to a bolt (not shown) passed through hole 69. In this manner, section facing 12 is further secured by means of flanges 26 and 32 to rear face 50 when the hinges (not shown) are mounted thereto.

With respect to lateral groove 52, a cut-out 54 is provided in the corner between sidewall 48 and rear face 50 to accommodate the change in contour imparted by the formation of lateral groove 52 in rear face 50. The ends of sidewall 48 also include cut-out portions 76 and 77 to therein accommodate a groove such as groove 34. A plurality of holes 61–68 are also pierced in rear face 50 to accommodate attachment of various components to end stile 14. For example, with respect to FIG. 2, self-tapping screws or rivets 112–117 may be used for the purpose of securing backing sheet 20 thereto.

An angle support 18 is adapted to be secured within each of end stiles 14 and thereby assist in securing end stile 14 to the ends of section facing 12. Holes 56 and 57 are included in sidewall 48 for the purpose of securing angle support 18 thereto. For example, with respect to angle support 18 shown in exploded relationship at the right side of FIG. 1, a pair of corresponding holes 85 and 86 are included in side element 81 of angle support 18 for the purpose of riveting or otherwise securing angle support 18 inside end stile 14 at holes 56 and 57. Additional holes 82–84 are included in side element 80 of angle support 18 and are configurated to correspond with ribs 36–38, respectively, of section facing 12 for the purpose of riveting or otherwise securing angle support 18 against ribs 36–38 while angle support 18 is secured inside end stile 14 thereby securely mounting section facing 12 to end stile 14. Rear face 50 of end stile 14 also includes enlarged apertures 70–72 which correspond to holes 82–84 for the purpose of permitting access for a rivet tool (not shown) during the riveting process of securing ribs 36–38 against angle support 18. It should be noted that end stiles 14 are dimensionally configurated to be received between channels 24 and 30 with hem 27 received in lateral groove 52 and hem 33 received in lateral groove 55. Front face 46 wraps around or otherwise engages the front surface of section facing 12 while angle support 18 serves to clamp the edge of section facing 12 between angle support 18 and front face 46 to reduce vibration or rattling which would otherwise possibly occur. The wrap-around feature also imparts a pleasing, finished appearance to the edge of the door section while concealing any sharp edges at the ends of section facing 12.

Center stile 16 is configurated with a modified C-like configuration and includes a front face 87, a sidewall 88, and a rear face 89. Center stile 16 differs from end stile 14 in that the distance between front face 87 and rear face 89 is substantially reduced in order to allow center stile 16 to fit inside door section 10 in the space defined by ribs 36–38 and flanges 26 and 32. Hem-receiving grooves for hems 27 and 33 are provided by lateral grooves 90 and 91, respectively. The formation of lateral grooves 90 and 91 is assisted by having cutouts 92 and 93, respectively, formed on the corner of center stile 16 to allow the shaping of the metal of center stile 16 as is well-known in the art. Front face 87 is adapted to be secured to ribs 36–38 by rivets (not shown) or the like. Access to the rivets is provided by enlarged apertures 101–103. Holes 94 and 100 in the base of grooves 90 and 91, respectively, serve as attachment sites for hinge (not shown) or the like. Additional holes 95–99 are provided in rear face 89 for the purpose of also securing the hinges (not shown) or other components to center stile 16. Holes 104, 105, 109, 110 along with slot 108 are also provided in center stile 16 and provide securement for a lock (not shown) or the like to be mounted to center stile 16.

During assembly of overhead door section 10, end stiles 14 are secured to the ends of section facing 12 through the use of rivets, or the like, in cooperation with angle supports 18 as set forth hereinbefore. Center stile 16 is also secured to section facing 12 according to the procedures set forth hereinbefore. Customarily, center stiles 16 are placed at no more than 40 inch intervals along the length of overhead door section 10. Selectively, slabs of insulative material 22 may be incorporated into the spatial areas of overhead door section 10 substantially filling the area in which they are placed. Advantageously, the open structure defined by the C-like cross section of end stiles 14 and center stile 16 allows the respective stiles to receive the insulative material 22 and substantially fill the interior thereof as best seen in FIG. 2. Thereafter, back facing 20, as a continuous sheet dimensionally corresponding to the rear face of overhead door section 10, may be inserted underneath flanges 26 and 32 and suitably secured to overhead door section 10 thereby providing an enclosed, insulated overhead door section 10. The addition of a continuous sheet in the form of back facing 20 provides a truss-like support to overhead door section 10.

The improved strength characteristics of the structure of the present invention has been demonstrated by comparing the static load characteristics of overhead door section 10 of the present invention with overhead door sections sold by other manufacturers. In comparitive tests, commerically available, prior art, uninsulated sections fabricated from 24 gauge, mild steel collapsed under loading ranges of 270–330 pounds. The loading was uniform across the length of the sections (12 feet).

Correspondingly, an uninsulated overhead door section 10 of this invention (12 feet long and fabricated with 28 gauge, high tensile steel) consisting of section facing 12, end stiles 14 and the requisite number of center stiles 16 was uniformly loaded to 540 pounds without collapse. This loading ratio is comparable to 22.5 pounds per square foot. Additional tests were also conducted with an overhead door section 10 of this invention and including insulative layer 22 and back facing 20. A 12-foot section was loaded uniformly to 720 pounds without collapse.

During fabrication, section facing 12 is provided as a pre-painted sheet metal and is passed through rolling dies. The improved quality of high tensile steels together with the unique properties provided by the hard, high gloss prepainted finish currently available makes this particular application feasible. As set forth hereinbefore, attempts at fabrication without this combination have failed. The various holes and apertures in section facing 12 and flanges 26 and 32 may be pre-punched by a flying punch as section facing 12 is removed from the forming dyes prior to being assembled into the overhead door section 10 of this invention. End stiles 14 and center stile 16 are also fabricated by well-known techniques with the holes and/or apertures therein suitably punched or pierced as dictated by the ultimate use of the hole. For example, when intended for use in conjunction with a bolt or a rivet, the hole is punched. When intended for use in conjunction with a self-tapping screw, the hole is pierced since the piercing operation leaves an upstanding rim or collar around the hole, the rim providing additional engagement surface for the self-tapping screw.

The invention may be embodied in other specific forms without departing from its spirit or essential characteristics. The described embodiments are to be considered in all respects only as illustrative and not restrictive and the scope of the invention, therefore, indicated by the appended claims rather than by the foregoing description. All changes that come within the meaning and range of equivalency of the claims are to be embraced within their scope.

What is claimed and desired to be secured by a United States Letters Patent is:

1. A method of preparing a section for an overhead door system comprising:

forming a section facing for the section by shaping a generally rectangular sheet of metal with a longitudinal channel along each edge of the section facing and a plurality of ribs in the facing;

fabricating end stiles for the section by forming sheet metal stock into end stiles having a front face, a side wall and a rear face, the front face being adapted to overlap the end of the section facing with the rear face fitting within the channels while the side wall encloses the end of the section;

preparing an angle support for the end stile, the angle support adapted to being received inside the end stile to accommodate clamping the end of the section facing against the front face of the end stile; and assembling the section by mounting an end stile to each end of the section facing and securing the end stile thereto by securing the angle support to the ribs of the section facing and to the side wall of the end stile.

2. The method defined in claim 1 wherein the assembling step further comprises imparting a truss effect to the section by mounting a continuous sheet back facing to the section.

3. The method defined in claim 2 wherein the mounting step further comprises inserting a body of insulative material in the section between the back facing and the section facing.

4. The method defined in claim 2 wherein the mounting step further comprises securing the back facing to the section by inserting the edge of the back facing into the channel and securing the back facing between the stile and the channel.

5. The method defined in claim 1 wherein the assembling step further comprises fabricating center stiles and inserting the center stiles into the section between the channels in juxtaposition with the ribs and securing the center stiles to the ribs.

*6. A method of preparing a section for an overhead door system comprising:*

*forming a section facing for the section by shaping a generally rectangular sheet of metal with a hem and a longitudinal channel along each edge of the section facing;*

*fabricating end stiles for the section by forming a metal stock into end stiles having a front face, a side wall and a rear face, and hem-receiving grooves adjacent each end of the rear face, the front face overlapping the end of the section facing with the ends of the rear face fitting within the channels with the hem receiving grooves receiving the hems therein while the side wall encloses the end of the section;*

*preparing support means at the side wall inside the end stile for securing the end of the section facing to the end stile; and*

*assembling the section by mounting an end stile to each end of the section facing and securing the end of the section facing to the end stile with the support means.*

*7. The method defined in claim 6 wherein the assembling step comprises leaving the hem in the hem-receiving groove without a fastener until subsequently secured by a hinge.*

* * * * *